Oct. 8, 1968
L. M. HUBBY
3,405,356
SYSTEM INCLUDING TWO PAIRS OF VOLTAGE ELECTRODES FOR
DETECTING DISCONTINUITIES IN INSULATION
COATINGS ON CONDUCTIVE CONDUIT
Filed Dec. 9, 1966
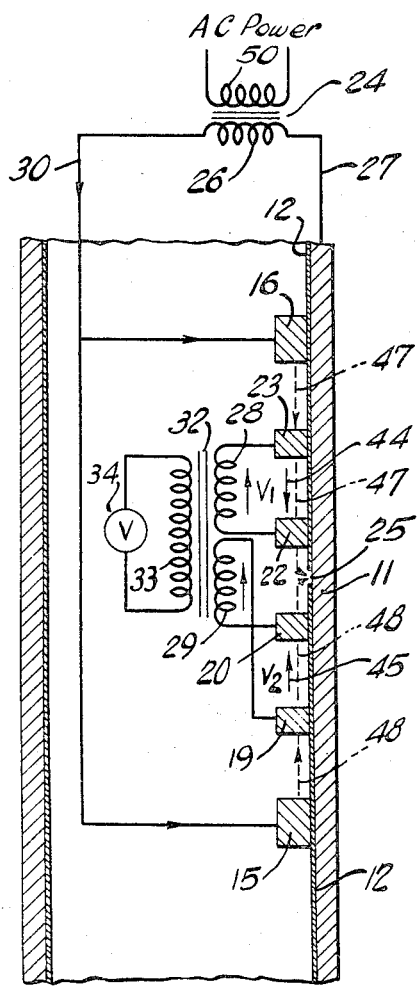
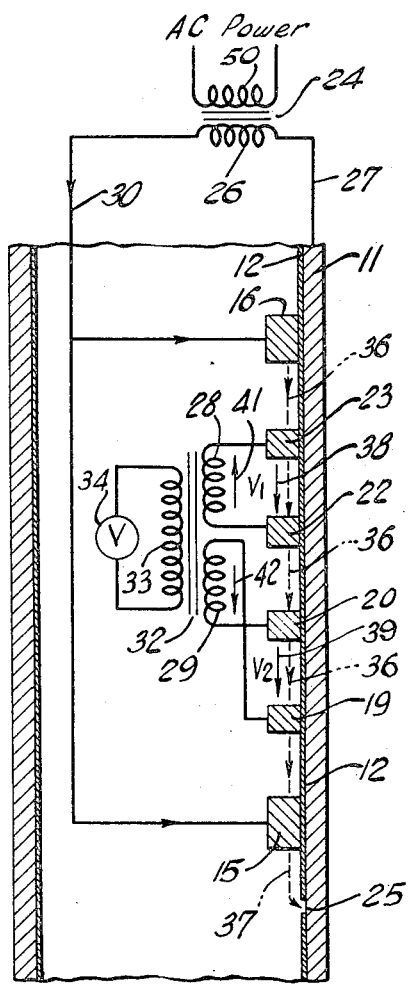

United States Patent Office 3,405,356
Patented Oct. 8, 1968

3,405,356
SYSTEM INCLUDING TWO PAIRS OF VOLTAGE ELECTRODES FOR DETECTING DISCONTINUITIES IN INSULATION COATINGS ON CONDUCTIVE CONDUIT
Laurence M. Hubby, Bellaire, Tex., assignor to Texaco Inc., New York, N.Y., a corporation of Delaware
Filed Dec. 9, 1966, Ser. No. 600,583
5 Claims. (Cl. 324—54)

ABSTRACT OF THE DISCLOSURE

Apparatus and method for detecting the location of discontinuities in insulation coating on the inside of metallic pipe when the pipe is filled with conductive fluid. It employs a pair of current electrodes having a potential applied between them and the metallic pipe. It also has two pairs of voltage electrodes spaced apart but both located between the current electrodes. The voltages between the voltage electrode pairs are measured and compared.

BACKGROUND OF THE INVENTION

(1) Field of the invention

This invention concerns a so-called "holiday" detector. More specifically, it relates to a system and method for detecting discontinuities in insulation coatings. It is particularly applicable to coatings on the interior of conduits, such as tubing and the like, employed in oil well operations.

In oil well operations where tubing or casing or other types of metallic pipes are employed and especially where such conduits have corrosion resistant coating on the insides thereof, it is of interest to be able to determine the location of any so-called holidays that may exist or develop in the coating. The coating will have been applied for providing protection against corrosion and for reducing adhesion of paraffin, etc.

When coated pipe has been set within an oil well there is ordinarily a liquid, or well fluid, that stands within the pipe. This presents an additional problem with respect to any attempt to locate a holiday or discontinuity in the coating on the pipe. The foregoing is especially true where the well fluid is electrically conductive in nature, and such condition is more apt to be the rule than the exception.

(2) Description of the prior art

While there have been some prior attempts to overcome the difficulties caused by electrically conductive fluid in coated pipe that is being checked for discontinuities in the coating, these have not been particularly successful in practice. Consequently it is an object of this invention to provide a system and method which is applicable to the detection of discontinuities in insulation coatings on electrically conductive pipe even where the pipe is filled with conductive fluid.

SUMMARY OF THE INVENTION

Briefly, the invention relates to a system for detecting discontinuities in insulation coatings on the inside of conductive conduit having conductive fluid therein. Such system comprises a pair of longitudinally spaced current electrodes for location adjacent to said coating, and a first circuit means for applying an electric potential between said electrodes and said conduit. The system also comprises two pairs of longitudinally spaced voltage electrodes located between said pair of current electrodes, and a second circuit means for measuring voltage drops between said voltage electrodes. The system operates so as to provide an indication of the presence of a discontinuity which may be positively detected when located between said pairs of voltage electrodes.

Again briefly, the invention may be described as a method for detecting discontinuities in insulation coatings on the inside of conductive conduit which has conductive fluid therein. The method comprises the steps of causing an electric current to flow between a pair of longitudinally spaced current electrodes inside said conduit and the conduit via one of said discontinuities in the insulation coating. The method also comprises the step of measuring a pair of potential drops caused by said electric current flow between two pairs of longitudinally spaced points both longitudinally between said current electrodes. The method further comprises the step of comparing the said potential drops in opposition to one another. Finally the method comprises the step of determining the location of a discontinuity in the insulation coating by noting the resultant presence of a substantial potential when said discontinuity is located between said pairs of longitudinally spaced points.

BRIEF DESCRIPTION OF THE DRAWING

The foregoing and other objects and benefits of the invention will be more fully set forth below in connection with the best mode contemplated by the inventor of carrying out the invention, and in connection with which there are illustrations provided in the drawing, wherein:

FIG. 1 is a schematic longitudinal cross-section of a portion of conduit, illustrating the elements of a discontinuity detector in accordance with the invention; and FIG. 2 is a similar showing that illustrates different conditions, i.e. when a discontinuity is located longitudinally outside of the current electrodes of the detector.

DESCRIPTION OF THE PREFERRED EMBODIMENTS

(1) Apparatus

Referring to either FIGURE 1 or FIGURE 2, it is to be noted that the illustrations are quite schematic. They show a conduit 11 that is constructed of an electrically conductive material, e.g. steel, aluminum, etc. The conduit 11 has an interior protective coating 12. This coating is a plastic which is an insulating material (electrically). It is applied to provide resistance to corrosion and otherwise to gain the beneficial effects of such a coating on the metal pipe 11.

In order to detect a so-called holiday, or discontinuity, in the coating 12 of pipe 11, the structure contemplated by this invention will include a pair of current electrodes 15 and 16. These electrodes are spaced longitudinally apart relative to the conduit 11, but are preferably rather close together in order to localize the electrical effects and provide a more accurate indication as to the location of a discontinuity in the coating.

It will be observed that the illustrations of the drawing, particularly as to the structure of the detector, are entirely schematic. For example, it ordinarily would be contemplated that the actual structure of electrodes 15 and 16 would provide a conducting material ring that would be adjacent to the entire inner periphery of the coating 12 at any given location of the tool within the conduit 11.

It will be observed that there are provided between electrodes 15 and 16 two additional pairs of electrodes 19–20 and 22–23. These pairs of electrodes are voltage type. They are employed for measuring the potential drops that may exist between the longitudinal locations of such electrodes. Here again, the structure of the electrodes ordinarily will be in the form of rings which may but need not engage the coating 12 all the way around the periphery of the inside of the conduit.

It will be observed that there is a source of electric potential as indicated by the caption "AC Power." This is connected between the conduit 11 and the pair of current electrodes 15–16 by means of a transformer 24 which has a secondary winding 26. One side of the winding 26 is connected to the conduit 11 by a connector 27, while the other side is connected to the pair of electrodes 15–16 via a connector 30.

Current flow will take place between the pair of current electrodes 15–16 and any discontinuities through the insulating coating 12, to the conductive material of the conduit 11. Consequently, depending upon the location of a discontinuity 25 relative to the current electrodes 15–16, the current flow paths will vary, as is illustrated in FIGURES 1 and 2.

Where the discontinuity is located outside of the longitudinal space between current electrodes 15 and 16, e.g. as illustrated in FIGURE 2, the major portion of the current flow will be from the adjacent current electrode such as electrode 15 in the illustrated situation. In addition, some slight current flow will exist from the other current electrode 16 through the conductive fluid within the conduit 16. Both of these currents will flow toward the discontinuity 25.

Under these conditions, potential drops between voltage electrodes 23–22 and 20–19 will be in the same sense and of approximately equal amplitude since the longitudinal spacings are equal. These potential drops are picked up by the potential electrodes and will cause current to flow in a pair of windings 28 and 29 that are connected between the potential electrodes 22–23 and 19–20, respectively. Windings 28 and 29 are input windings of a transformer 32 and they each have an equal number of turns. Input signals in these windings will cause output signals in a secondary winding 33 that has a voltmeter 34 connected thereacross.

It will be observed that the transformer input windings 28 and 29 are connected oppositely relative to the corresponding pair of potential electrodes 22–23 and 19–20 in each case. For this reason, the voltage signals applied to these input windings of the transformer 32 will be in opposition when the potential drops are in the same sense or direction between the pairs of potential electrodes.

Such opposition conditions are illustrated in FIGURE 2. The discontinuity 25 is shown located below (when viewed as illustrated in FIGURE 2) the current electrode 15, and consequently the current flow path is from the electrodes 15 and 16 downward through the fluid within the conduit 11 to the discontinuity 25. This is indicated by dashed lines 36 and 37 in FIGURE 2 that illustrate such current flow paths.

The opposition conditions are also indicated by a pair of arrows 38 and 39 that show the potential drops captioned $V_1$ and $V_2$ respectively, as being downward along the current path between electrodes 23–22 and electrodes 20–19 in each case. These potential drops are applied in an opposite sense to the windings 28 and 29, as is indicated by arrows 41 and 42 respectively, located adjacent to these windings. The resultant voltage input signal to the transformer 32 will be substantially zero as these two inputs are in opposition.

When the detector is located relative to the discontinuity 25 such that the discontinuity is located longitudinally between the electrodes, substantial signal conditions will be encountered with a maximum when the discontinuity 25 is located centrally between the potential electrodes 22 and 20, as is illustrated in FIGURE 1. The reason for this will be clear with reference to the FIGURE 1 showings where conditions are illustrated in a manner similar to that of FIGURE 2. Thus, while the voltage $V_1$ in the FIGURE 1 illustration is indicated by an arrow 44 that is in the same direction as the arrow 38 in the case of the FIGURE 2 conditions; the voltage $V_2$ represented by an arrow 45 in FIGURE 1, is in the opposite direction from its counterpart arrow 39 (FIGURE 2) under the conditions that are illustrated in FIGURE 2.

Consequently, since the sense or direction of the voltage drops between electrodes 22–23 and 19–20 have now had one reversed, the resultant input to transformer 32 is such that the voltages add to one another and consequently a substantial output voltage in the secondary winding 33 will be developed. This will be indicated by the voltmeter 34. The current flow paths are illustrated by dashed lines 47 and 48 in FIGURE 1.

Thus, when a discontinuity exists that has a relative position that is between the innermost ones of the potential electrodes, i.e. 20 and 22, the indication or output signal from the detector will be at a maximum. Under other conditions, such as where the discontinuity is located outside of the detector structure, i.e. longitudinally above or below the current electrodes 15 and 16 when viewed as illustrated, the output signal from the detector will be a minimum.

The total effect is that the indication of a discontinuity is strong and definite and may be determined by a maximum reading of the voltmeter 34. Therefore, when this condition exists, a measurement of the location of the detector in the conduit will determine the longitudinal location of a discontinuity.

It may be observed that there is a two-fold reason why the indication of a discontinuity is increased in strength when the discontinuity location is within the electrodes. One reason is the fact that when the discontinuity is longitudinally outside of current electrodes 15 and 16, a major portion of current flow to the discontinuity will be carried from the adjacent one of the current electrodes with only a small fraction flowing over the parallel path from the other electrode through the fluid in the conduit. Consequently, the potential drops are small in proportion to the small current flow. However, on the other hand, when the discontinuity is located between the electrodes 15 and 16, the current flow to the discontinuity will be divided more or less equally in flowing from the electrodes. Consequently, the potential drops will be proportionally larger as the current flows are larger and the output voltage signal will be at a higher amplitude when the discontinuity is located between the current electrodes than when the discontinuity is outside thereof.

Of course, the second reason is that made clear by the foregoing explanation of the structure and operation of a preferred embodiment of the invention, i.e. the reversed connections from one pair of voltage electrodes. This causes the inputs to transformer 32 to be in opposition when the discontinuity is outside the current electrodes, and therefore the resultant is substantially zero.

It will be clear that the physical structure of a detector which may be constructed for carrying out a method according to this invention might take any feasible form. Consequently, no suggestion for any particular design has been illustrated. Furthermore, it will be clear that the current electrodes 15 and 16 as well as the potential electrodes therebetween, i.e. 19–20 and 22–23, will be annular in structure but may not necessarily contact the entire inner periphery of the coating 12 on the inside of the conduit 11.

Similarly, it will be appreciated that the circuit diagrams are strictly electrical schematics and the connections from the electrodes to the transformer windings, etc. might be done in a variety of ways as to physical form and arrangements. Thus, the output signal indications of the detector, e.g. voltmeter 34, might be either developed downhole and transmitted up to the surface by telemetering, or the circuit connections might be made by cable for carrying the signals uphole from the transformer to the surface. It is presumed that it is most feasible to have the transformer 32 located downhole in order to keep the circuit connections from voltage electrodes to the input windings 28 and 29 as short as possible.

Of course, in the same way, the application of an AC potential to the current electrodes 15 and 16 will be applied over the circuit connections 27 and 30 that lead from the ends of the secondary winding 26 of the transformer 24 which is located at the surface. Circuit connection 30 connects with both current electrodes 15 and 16 in parallel, while connection 27 goes to the conductive material conduit 11. An input winding 50 of the transformer 24 will be connected to any feasible source of power such as an AC power supply or the like.

(2) *Method*

This invention may also be defined in terms of a method since various forms of apparatus may be employed, which apparatus is not merely the equivalent of the type illustrated above in connection with the first embodiment there described. The method concerns detection of discontinuities in insulation coatings on the inside of conductive conduit, and such detection particularly where the conduit is filled with a conductive fluid therein. The steps for carrying out this method comprise the following, which are not necessarily restricted to the order as set forth (1) The steps of causing an electric current to flow from a pair of longitudinally spaced current electrodes adjacent to the coating, e.g. electrodes 15 and 16 illustrated in the drawings, to the conducting material conduit via any discontinuity or discontinuities in the coating. Clearly, this step may be carried out by various arrangements for applying a potential (which is preferably AC) between the conduit and the pair of current electrodes so that current will flow through any discontinuity existing in the insulation coating.

(2) The step of measuring a pair of potential drops caused by the electric current flow. These drops are taken between two pairs of longitudinally spaced points, and both pairs of points are located longitudinally between said current electrodes. These potential drop measurements may be made with various types of equipment that clearly need not be equivalents of the voltage electrodes and related apparatus that is schematically illustrated in the drawings.

(3) The step of comparing the foregoing voltage drops with one taken in the opposite sense to the other. This step provides for making comparison of two potentials with one reversed as to the physical location of its source relative to the other. It will be clear that this comparison step may be carried out by making direct measurement of each potential drop and taking a summation of such measurements with any type of equipment for doing so. Clearly, this might be done with circuit elements that are not mere equivalents for the two winding transformer structures that are illustrated in the drawings.

(4) The step of determining the location of a discontinuity in the insulation coating by noting the resultant presence of a substantial potential when said discontinuity is between said pairs of longitudinally spaced points. This step is accomplished with many possibilities as to the manner of carrying it out. Thus, a visual determination of the summation voltage by reading a voltmeter, is one manner of accomplishing the step that would suggest itself from the foregoing apparatus description relating to the drawings. Another way is for the summation signal to be applied to a recording apparatus and, of course, this might be accomplished either within the conduit or at the surface, depending upon the type of apparatus to be employed. Clearly, the different types of apparatus needed for accomplishing this step would not necessarily be equivalent to one another.

While a preferred embodiment of the invention has been described above in considerable detail in accordance with the applicable statutes, this is not to be taken as in any way limiting the invention but merely as being descriptive thereof.

I claim:

1. A system for detecting discontinuities in insulation coatings on the inside of conductive conduit having conductive fluid therein, comprising
   a source of electric potential,
   a pair of longitudinally spaced current electrodes for location adjacent to said coating,
   first circuit means for applying said electric potential between said electrodes and said conduit in order to cause current flow from said current electrodes to said conduit through said discontinuities,
   two pairs of longitudinally spaced voltage electrodes located between said pair of current electrodes, and
   second circuit means connected to said voltage electrodes for measuring voltage drops between said voltage electrodes of each pair
   whereby presence of a discontinuity will be positively detected by net voltage output from said second circuit means when one of said discontinuities is located between said pairs of voltage electrodes.

2. A system according to claim 1 wherein said second circuit means comprises
   means for summing said voltage drops to obtain a resultant that is minimal when a discontinuity is longitudinally outside of said current electrodes but maximum when it is between said pairs of voltage electrodes.

3. A system according to claim 2 wherein said electric potential is AC, and
   wherein said summing means comprises a transformer having a pair of input windings,
      circuit means for connecting one of said pair of voltage electrodes to each of said input windings, and
      an output winding for providing a summation signal,
      said input windings being connected in opposing relation when the voltage drops between said electrode pairs are in the same sense.

4. A system according to claim 3 further including a voltmeter connected to said output winding for indicating said summation signal.

5. A system according to claim 4 wherein said voltage electrode circuit means comprises means for connecting the ends of one of said input windings to given ones of one of said pairs of voltage electrodes, and
   means for connecting the ends of the other of said input windings to the correspondingly opposite ones of the other of said pair of voltage electrodes.

References Cited

UNITED STATES PATENTS 3,210,655  10/1965  McGlasson et al. ____ 324—54
3,303,418  2/1967   Rose _____ 324—64

RUDOLPH V. ROLINEC, *Primary Examiner.*

GERARD R. STRECKER, *Assistant Examiner.*